United States Patent [19]

Janssen et al.

[11] 4,020,026

[45] Apr. 26, 1977

[54] PLASTICITY INDEX IMPROVERS AND METHOD OF USE

[75] Inventors: Frits W. Janssen, Serbalawan, Sumatra, Indonesia; Edward A. Sinclair, Kent, Ohio

[73] Assignee: The Goodyear Tire & Rubber Company, Akron, Ohio

[22] Filed: Apr. 17, 1975

[21] Appl. No.: 568,876

[52] U.S. Cl. .............................. 260/3; 260/2 EN; 260/739
[51] Int. Cl.² ........................................ C08L 7/02
[58] Field of Search .................... 260/3, 739, 2 EN

[56] References Cited

UNITED STATES PATENTS 3,639,327   1/1972   Drelich et al. .................. 260/3

Primary Examiner—J. Ziegler
Attorney, Agent, or Firm—F. W. Brunner; J. D. Wolfe

[57] ABSTRACT

This invention provides a method of treating rubber in the latex or nonlatex form with polyethylenimine to improve the plasticity and plasticity retention index of the unvulcanized elastomer.

5 Claims, No Drawings

PLASTICITY INDEX IMPROVERS AND METHOD OF USE

This invention relates to the improvement of the plasticity and plasticity retention index (PRI) of unvulcanized elastomers. More particularly, this invention relates to improvement of the plasticity and PRI of natural rubber by treating the latex with polyethylenimine, $(CH_2CH_2NH)_x$, of 600 to 100,000 molecular weight, preferably as a viscous liquid, having a volume sufficient to give its molecular weight.

Methods to increase the plasticity of natural rubber by treatment of the latex or dry rubber stock with agents such as hydrazine hydrate or hydrazine sulfate usually result in a reduction of the PRI of the rubber.

This invention is based upon our discovery that polyethylenimine is a very effective stiffening and PRI agent in unvulcanized rubber compositions when added either to the latex or the dry rubber. We have found that polyethylenimine is particularly effective as a stiffening agent when added in small concentrations to latex. More specifically, we have found that polyethylenimine exerts effective PRI and plasticity improvement if added in concentrations ranging from 0.05 to 1.0 part of polyethylenimine per 100 parts of dry rubber. The marked effectiveness of such low concentrations as plasticity and PRI agent, combined with good physical properties such as miscibility in water, the relative ease of handling makes use of polyethylenimine in crude rubber processing desirable. The polyethylenimines of 600 to 100,000 molecular weight are used in this invention with the preferred ones having a molecular weight of 600 to 30,000.

After addition the polyethylenimine is mixed thoroughly with the latex. The rubber is recovered by coagulation with the usual coagulation agents such as formic acid or surfactants. The coagulum is milled on creper mills into a blanket which is then crumbled in a hammermill. The crumb is dried in a hot air circulated oven at 110° C. and after cooling to less than 60° C., compressed into bales weighing 75 pounds each.

The nature of this invention and its usefulness is further exemplified in the following representative examples where all parts and percentages are by weight unless otherwise designated.

EXAMPLE I

A low ammoniated (0.08 percent) field grade natural rubber latex was diluted with water to 25 percent dry rubber content and divided into three batches which were treated with polyethylenimine, viz. PEI-12 as shown in Table 1 under identification numbers 158-1A, B and C. The rubber from the treated batches was recovered by coagulation of the latex with sufficient formic acid (diluted to a five percent solution) to give a pH of 5. The coagulum was milled into a blanket which then was treated with 0.2 percent castor oil on dry rubber weight and crumbled in a hammermill. The crumb was dried at 110° C. The properties of the dried rubber are shown in Table 1.

Table 1

| Batch 158-1 | A | B | C |
|---|---|---|---|
| PEI-12[1] percent on dry rubber wt. | 0 | 0.1 | 0.2 |
| Volatile matter | 0.23 | 0.28 | 0.26 |
| Dirt content | .009 | .008 | .007 |
| Ash content | 0.29 | 0.24 | 0.22 |
| Wallace Plasticity (Po) | 37 | 41 | 43 |
| PRI | 64 | 90 | 96 |

[1] PEI-12, commercial polyethylenimine of 1200 molecular weight.

EXAMPLE II

A skim grade natural rubber latex was deammoniated to an ammonia content of 0.20 percent. The latex was divided into three batches which were treated with polyethylenimine, (PEI-12 grade) as shown in Table 2 under identification numbers 158-2, S1, S2 and S3. The skim latex was coagulated by addition of formic acid until the pH of the latex reached 5.2. The coagulum was milled and crumbled with 0.2 percent castor oil on dry rubber weight in a hammermill. The properties of the dried rubber are shown in Table 2.

Table 2

| Batch 158-2 | S1 | S2 | S3 |
|---|---|---|---|
| PEI-12 percent on dry rubber wt. | 0 | 0.1 | 0.2 |
| Volatile matter | 0.45 | 0.49 | 0.52 |
| Dirt content | .006 | .009 | .005 |
| Ash content | 0.50 | 0.39 | 0.41 |
| Wallace plasticity (Po) | 57 | 62 | 60 |
| PRI | 20 | 27 | 45 |

EXAMPLE III

A low ammoniated field grade natural rubber latex was divided into five batches which were treated with polyethylenimine of 50,000 to 100,000 molecular weight as shown in Table 3. After thorough mixing each batch was coagulated by addition of formic acid (diluted to a 5 percent solution) until the pH of the latex reached 5.0.

The coagulum was milled into a blanket which then was crumbled in a creper hammermill with 0.2 percent castor oil on dry rubber weight. The crumb was dried in a hot air circulated oven at 110° C. The Wallace plasticity (Po), and Mooney viscosity of the dried rubber were determined. The results are shown in Table 3.

Table 3

| Batch 91 | A | B | C | D | E |
|---|---|---|---|---|---|
| Polyethylenimine (50,000–100,000 mol. wt.) Percent on dry rubber wt. | 0 | 0.1 | 0.2 | 0.4 | 0.8 |
| Wallace Plasticity (Po) | 52 | 61 | 67 | 76 | 79 |
| Mooney S(1 + 4) 100° C. (small rotor) | 44.5 | 49.5 | 54 | 60 | 62.5 |

EXAMPLE IV

Natural rubber latex concentrated to a dry rubber content of 61 percent by centrifugation, with an ammonia content of 0.25 percent was divided into four batches which were treated as shown in Table 4. Each batch was coagulated by addition of formic acid (diluted to a five percent solution) until the pH of the latex reached 5.0. The coagulum was milled into a thin crepe which was dried in a hot air circulated oven at 110° C. The properties of the dried rubber are shown in Table 4.

Table 4

| Batch 171 | A | B | C | D |
|---|---|---|---|---|
| Hydroxylamine HCL | 0.15 | — | — | — |
| PEI-12 | — | 0.20 | — | — |
| Hydrazine Hydrate | — | — | 0.10 | — |
| Wallace plasticity (Po) | 43 | 62 | 69 | 51 |
| PRI | 63 | 84 | 73 | 80 |
| ΔP | 1.5 | 29 | 2.5 | 36.5 |

All chemicals were added in percent on dry rubber weight.

EXAMPLE V

A low ammoniated (0.08 percent) field grade natural rubber latex was divided into four batches which were treated as shown in Table 5. The latex was coagulated by addition of formic acid (diluted to five percent solution) until its pH reached 5.0. The coagulum was milled into a blanket which then was crumbled in a hammer-mill with 0.2 percent castor oil on dry rubber. The crumb was dried in a hot air circulated over at 105° C. The properties of the dried rubber are shown in Table 5.

Table 5

| Batch 179 | 1 | 2 | 3 | 4 |
|---|---|---|---|---|
| Hydrazine Hydrate | — | 0.2 | — | — |
| Di-hydrazine sulfate | — | — | 0.2 | — |
| PEI-12 | — | — | — | 0.2 |
| Wallace plasticity (Po) | 49 | 64 | 65 | 74 |
| PRI | 90 | 78 | 78 | 93 |
| ΔP | 25 | 3.5 | 3.5 | 21 |

All chemicals were added in percent on dry rubber weight.

In case of rather unstable latex the polyethylenimine is to be added as a 10 percent solution in water, otherwise premature coagulation might occur.

Although previous examples have shown polyethylenimine being added to latex, it can be used effectively to treat rubber in nonlatex form. For instance, a rubber crumb could be soaked in a dilute solution to achieve the benefit of this invention, or it can be added to rubber on the mill.

EXAMPLE VI

In this example, samples of a field latex which had had the yellow fraction removed to give a latex suitable for the preparation of shoe sole crepe rubber had 0 and 0.2 parts per hundred (phr) respectively of polyethylenimine of 10,000 to 30,000 molecular weight intimately mixed therein and then coagulated according to the procedure of Example I. The coagulum was milled into thin crepe and air dried. The dry crepe was laminated to give a pad of the thickness of a shoe sole. Shoe soles were cut from each sheet or pad and Po and PRI run on the samples as shown in Table 6.

Table 6

| Sample | Sole A | Sole B |
|---|---|---|
| Polyethylenimine Treatment, phr | 0 | 0.2 |
| Po | 39 | 53.5 |
| PRI | 38 | 97 |

These data show the polyethylenimine treatment of latex to be particularly desirable for the preparation of crepe sole stock.

The Wallace plasticity and plasticity retention index are determined according to the description of the PRI determination in Rubber Research Institute of Malaya Bulletin No. 7, page 17.

The PRI is determined by measuring the Wallace plasticity of the raw rubber polymer before and after aging for 30 minutes at 140° C. The PRI is the aged plasticity expressed as a percentage of unaged plasticity.

As the PRI is an aging test it gives a direct measure of the resistance of raw rubber to oxidative breakdown at high temperatures.

The natural rubber polymer has a chemical structure which makes it susceptible to oxidation by, for instance, exposure to sunlight, high temperatures, or excessive mechanical working.

Oxidation is always accompanied by reduction of molecular length of the rubber polymer. Low molecular weight rubber has poorer physical and technological properties such as lower compound viscosity resulting in lower resilience of the vulcanizates, which in its turn results in large heat build-up. The breakdown of the raw rubber during mastication and mixing (at temperatures above 100° C.) and the aging of vulcanizates at elevated temperatures are both oxidative processes. In processes where retention of high molecular weight is desired, natural rubber with high PRI has therefore distinct advantages over low PRI rubber.

EXAMPLE VII

Crumb rubber, SIR 20 grade, was passed 24 times through a dry laboratory mill with a nip roll setting of 1.25 mm. with the rubber being doubled before each pass. The results of this milling treatment on physical properties are shown in Table 7 for crumb rubber treated and untreated with polyethylenimine.

Table 7

| Percent Treatment PE-12 | 0 | 0.2 |
|---|---|---|
| Po | 29 | 38 |
| PRI | 74 | 102 |
| ΔP | 11 | 37.5 |

While certain representative embodiments and details have been shown for the purpose of illustrating the invention, it will be apparent to those skilled in the art that various changes and modifications may be made therein without departing from the spirit or scope of the invention.

What is claimed is:

1. A method of improving plasticity and plasticity retention index of natural rubber comprising treating a natural rubber latex with about 0.05 to 1.0 part of polyethylenimine of about 600 to 100,000 molecular weight per 100 parts of rubber, coagulating the latex and recovering the rubber from the latex.

2. A method as described in claim 1 wherein the elastomer is a fresh field grade natural latex.

3. A method as described in claim 1 wherein the elastomer is a fresh field grade natural latex which is considerably diluted either before or after the treatment thereof.

4. A method as described in claim 1 wherein the rubber is present as a concentrated natural latex at the time of the polyethylenimine treatment.

5. A method as described in claim 1 wherein the elastomer is a skim grade natural rubber latex.

* * * * *